United States Patent [19]

Shimoyama

[11] Patent Number: 4,489,132

[45] Date of Patent: Dec. 18, 1984

[54] SPHERICAL BODIES OF CARBON OR GRAPHITE

[75] Inventor: Tatsuo Shimoyama, Hitachi, Japan

[73] Assignee: Hitachi Chemical Company, Ltd., Tokyo, Japan

[21] Appl. No.: 416,611

[22] Filed: Sep. 10, 1982

[30] Foreign Application Priority Data

Sep. 12, 1981 [JP] Japan ................... 56-14425

[51] Int. Cl.$^3$ ................... B32B 9/00; B29C 23/00
[52] U.S. Cl. ................... 428/408; 428/402; 264/15; 23/314
[58] Field of Search ................... 428/408, 402; 264/15

[56] References Cited

U.S. PATENT DOCUMENTS

| | | | |
|---|---|---|---|
| 3,547,676 | 12/1970 | Bokros et al. | 428/408 X |
| 3,830,730 | 8/1974 | Amagi et al. | 428/408 X |
| 4,082,694 | 4/1978 | Wennerberg et al. | 428/408 X |

FOREIGN PATENT DOCUMENTS 105116  8/1979  Japan ................... 428/408

*Primary Examiner*—Patricia C. Ives
*Attorney, Agent, or Firm*—Antonelli, Terry & Wands

[57] ABSTRACT

A spherical body of baked or graphitized carbon having a thermal conductivity at 25° C. of 0.03 cal/cm.sec.°C. or more and an anisotropy of thermal expansion coefficient of 40% or less has an excellent service life under severe thermal conditions without causing pitting or cracking and can be used as industrial machine parts such as ball bearings.

9 Claims, 4 Drawing Figures

SPHERICAL BODIES OF CARBON OR GRAPHITE

BACKGROUND OF THE INVENTION

This invention relates to the improvement on spherical bodies of carbon or graphite which are used as industrial machine parts.

As is well known, the spherical bodies of carbon or graphite used as sliding members, etc., in industrial machines have many advantages such as light weight and compactness, low frictional properties, splendid wear resistance and thermal dimensional stability over steel and plastic spherical bodies.

Conventional spherical bodies of carbon or graphite are formed by cutting and polishing carbon materials which have been obtained by (1) kneading with heating a raw material such as coke, carbon black, natural graphite, artificial graphite, etc., with a binder such as tar, pitch, etc., molding under pressure the resulting mixture, followed by heat treatment or baking, if necessary further graphitization, or (2) gradually heating in an oxidizing atmosphere a cured material of thermosetting resin such as a phenolic resin, furan resin or the like alone or pitch containing a large amount of aromatic components to give non-melted pitch alone, molding the cured material of thermosetting resin or the non-melted pitch under pressure, followed by heat treatment (baking and if necessary graphitization). The carbon material obtained by the process (1) exhibits a high degree of anisotropy in material strength and that obtained by the process (2) is so-called vitreous carbon which has fine crosslinking and hardly brings about the growth of graphite crystals even if subjected to graphitization treatment, so that it cannot be sufficient in thermal conductivity. Also, in practical use of the spherical bodies made from said carbon materials as bearings for instance, when a part of the spherical body is exposed to severe conditions such as rapid heating or quenching, the surface of the spherical body would suffer from "pitting" or the spherical body itself would develop cracks due to a difference in thermal expansion between the surface and inside portion of the spherical body, resulting in a short service life of the spherical body.

SUMMARY OF THE INVENTION

An object of this invention is to provide a spherical body of carbon or graphite which is free of pitting or cracking even when placed under severe conditions such as local rapid heating or quenching due to frictional heat or other causes and which can thus well serve as an industrial machine part.

More specifically, this invention provides a spherical body of a carbon material such as baked or graphitized carbon having a thermal conductivity at 25° C. of 0.03 cal/cm.sec.°C. or more and an anisotropy of thermal expansion coefficient of 40% or less.

DETAILED DESCRIPTION OF THE PREFERRED EMBODIMENTS

Figure 1:
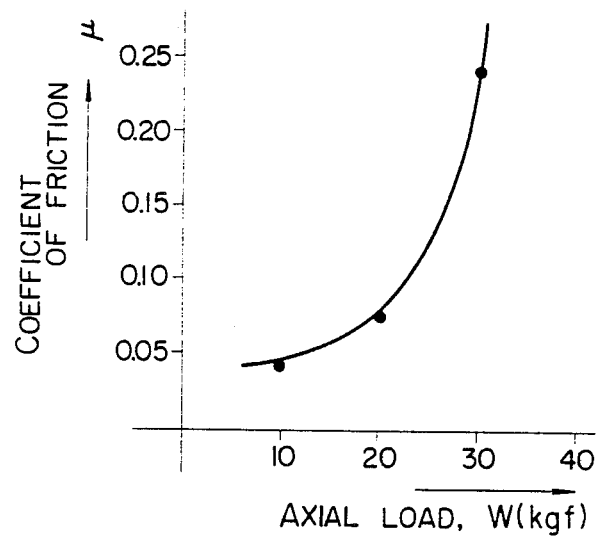
FIG. 1 is a graph showing the results of a four ball machine test conducted on a conventional spherical body of carbon material.

This inventor has succeeded in avoiding, to some extent, pitting damage on the spherical body surface by treating a carbon material (baked or graphitized carbon) of the spherical body so as to have a certain specified thermal conductivity. As a result of further researches, there was disclosed a fact that an anisotropy of coefficient of thermal expansion of the carbon material (such an anisotropy being expressed by $C_{max} - C_{min}/C_{max} \times 100$, wherein $C_{max}$ is the maximum coefficient of thermal expansion of the carbon material and $C_{min}$ is the minimum coefficient of thermal expansion of the carbon material) has bearing on pitting and thermal shock cracking of the spherical body of said carbon material. It was further found that it is possible to uniformly approximate the difference of thermal expansion of the carbon material by providing the carbon material with a specified thermal conductivity as said above and by also regulating the anisotropy of the coefficient of thermal expansion in a certain defined range, and it is thereby possible to prevent damage due to thermal shock such as pitting or cracking, which has been the fatal defect of the conventional spherical bodies of carbon, even when the spherical bodies made from said carbon material are used under severe conditions such as rapid heating or quenching.

Thus, the prominent feature of this invention resides in that the carbon material used for forming the spherical body is defined in both thermal conductivity and anisotropy in coefficient of thermal expansion (hereinafter referred to simply as anisotropy) within certain given ranges respectively. This enables uniform approximation, in a thermodynamical sense, too, of the differences of thermal expansion between the surface and inside portions of the spherical body, thereby making it possible to prevent occurrence of pitting or cracking which has been the unavoidable defect of the conventional spherical bodies of carbon material. It is to be noted that the above-said effect of this invention can not be obtained if only one of said two factors, that is, thermal conductivity or anisotropy of the carbon material, is regulated in the defined range.

It is essential that the carbon material used in this invention has the thermal conductivity (25° C.) of 0.03 cal/cm.sec.°C. or more and the anisotropy of thermal expansion coefficient of 40% or less. If the thermal conductivity is less than 0.03 cal/cm.sec.°C. and/or the anisotropy exceeds 40%, the produced spherical body is unbalanced in thermal stress and becomes vulnerable to pitting on the surface or cracking in the spherical body itself. It is preferred that said thermal conductivity is not less than 0.1 cal/cm.sec.°C. and in the case of graphitized carbon 0.5 cal/cm.sec.°C. or more, and usually up to 1.0 cal/cm.sec.°C. or more and the anisotropy not higher than 25%.

The carbon material used in this invention includes those obtained as mentioned below:

A high carbon-containing material having an aromatic component as major component such as coal tar pitch, petroleum pitch, asphalt, oil sand, etc., is heated in a non-oxidizing atmosphere at high temperatures such as 400° C. to give a polycondensate. The polycondensate as it is or small spherical bodies having an optical anisotropy (mesophase) obtained by solvent fractionation of the polycondensate, that is, a baking-type carbon precursor alone, or a molding power of the carbon precursor alone or that obtained by mixing the abovementioned carbon precursor with a carbon powder obtained by grinding petroleum or coal raw cokes to 10 μm or less is (i) molded by using a rubber pressing method capable of providing uniform pressing from three-dimensional directions, followed by heat treatment (baking), or (ii) the above-mentioned molding powder is preformed in a mold, and molded by using a rubber pressing method capable of providing uniform pressing from three-dimensional directions, followed by heat treatment (baking).

The heat treatment of the high carbon-containing material is preferably conducted at a temperature of 300° to 500° C. to give the carbon precursor in high yield. Further, as to the carbon precursor, it is preferable to use the small spherical bodies having optical anisotropy compared with the use of the polycondensate as it is to give a stable carbon material. When the polycondensate is used as it is, it is preferable to use that having the atomic ratio H/C of 0.4 to 0.57, the quinoline soluble matter of 2 to 15% by weight and the carbonization rate of 80 to 90% by weight to give a carbon material having excellent pitting resistance, crack resistance, and the like. When the molding powder is used, it is preferable to use the carbon precursor alone without adding grinding carbon derived from raw cokes for giving a carbon material having fine matrix.

The temperature used for the heat treatment in said both methods (i) and (ii) is preferably within the range of 800°–1,300° C. in the case of baked carbon from a shaped green carbon and 2,000°–2,600° C. in the case of graphitized carbon from a shaped green carbon.

For forming the spherical bodies by using the carbon material according to this invention, there may be employed any suitable one of the conventional methods such as: (a) cubes of the carbon material so formed as to have the equal sides are rolled round till they come to take a spherical form; (b) the carbon material is previously press molded into a form close to sphere and the moldings are rolled around to let them have a spherical form; (c) the carbon material is worked by cutting into a form close to sphere and further ground to form the desired spherical bodies. Among these methods, (b) is preferred for the reasons of high yield from the carbon material and easy obtainability of an isotropy in material structure.

As mentioned above, since the carbon material used in this invention is heat treated in a non-oxidizing atmosphere, the resulting material has the thermal conductivity (25° C.) of 0.03 cal/cm.sec.°C. or more and the anisotropy of 40% or less. In contrast, according to the conventional methods, since the heat treatment is conducted partially in an oxidizing atmosphere, the resulting carbon materials (graphitized products) have the thermal conductivity of 0.005–0.02 cal/cm.sec.°C. and the anisotropy of 30–60%.

This invention is illustrated by way of the following Examples.

EXAMPLE 1

Coal tar pitch was heat treated at a temperature of 440° C. in a nitrogen stream and the resultantly produced optically anisotropic spherules were subjected to solvent fractionation and then preliminary baked at 380° C. in a nitrogen stream to obtain a high-density and high-strength isotropic carbon material precursor. This precursor was preformed in a mold, then pressure molded into a form close to sphere by using a rubber press and then baked at a maximum temperature of 1,000° C. to obtain a carbon material having the thermal conductivity (25° C.) of 0.4 cal/cm.sec.°C. and the anisotropy of 18%. This carbon material was formed into the spherical bodies by using abrasive grains. The thus obtained spherical bodies were incorporated in a deep-groove ball bearing (JIS # 6205) and subjected to a load bearing test by applying a radial load at a rate of 5 Kgf/10 min. under rotation of 1,500 r.p.m. No flaw detrimental to bearing such as pitting, cracks, etc., was noted on the surface of each spherical body even when the load has reached 60 Kgf.

EXAMPLE 2

A carbon precursor material having an H/C atomic ratio of 0.47, quinoline soluble matter of 4.8% and a carbonization rate of 82% by weight, said precursor material being not dissolved by heating of up to 500° C. and having a thermal deformation shrinkage factor of 2% or higher was obtained by heat treating a petroleum pitch at 350° C. in a nitrogen stream. Then, the carbon precursor was treated in the some manner as described in EXAMPLE 1 to obtain a carbon material having the thermal conductivity of 0.3 cal/cm.sec.°C. and the anisotropy of 20%. This carbon material was formed into spherical bodies in the same way as EXAMPLE 1 and subjected to the same load bearing test as conducted in EXAMPLE 1. The surface of each spherical body remained free of any flaw detrimental to bearings such as pitting, cracks, etc., even when the load has reached 60 Kgf.

EXAMPLE 3

The carbon material of EXAMPLE 1 was further heat treated at a temperature of maximum 2,400° C. to obtain a graphitized carbon material having the thermal conductivity of 0.6 cal/cm.sec.°C. and the anisotropy of 12%. This graphitized carbon material was formed into spherical bodies after the manner of EXAMPLE 1 and subjected to the same test as in EXAMPLE 1. No damage to the spherical bodies of graphitized carbon material was observed even when the load applied to the spherical bodies has reached 60 Kgf.

For the mechanical reasons of the testing machine, it was impossible to conduct the load test under a load higher than 60 Kgf in above-described EXAMPLES 1, 2 and 3.

COMPARATIVE EXAMPLE 1

Denatured petroleum pitch prepared by heating petroleum pitch to 450° C. and rendering it into heavy nature under a nitrogen gas atmosphere was infusibilized in a temperature of 210° C. in an oxygen gas stream to obtain a carbon precursor (vitreous carbon) and this precusor was treated similarly to EXAMPLE 1 to form spherical bodies having vitreous fructured surfaces and subjected to the load test under the same conditions as in EXAMPLE 1. As a result, the spherical bodies suffered from pitting under the loads of 35 Kgf and 42 Kgf and developed cracks under the load of 36 Kgf, and thus any of these spherical bodies could not perform the intended function as bearings. The carbon material of the spherical bodies had at this point the thermal conductivity of 0.01 cal/cm.sec.°C. and the anisotropy of 33%.

Figure 2:
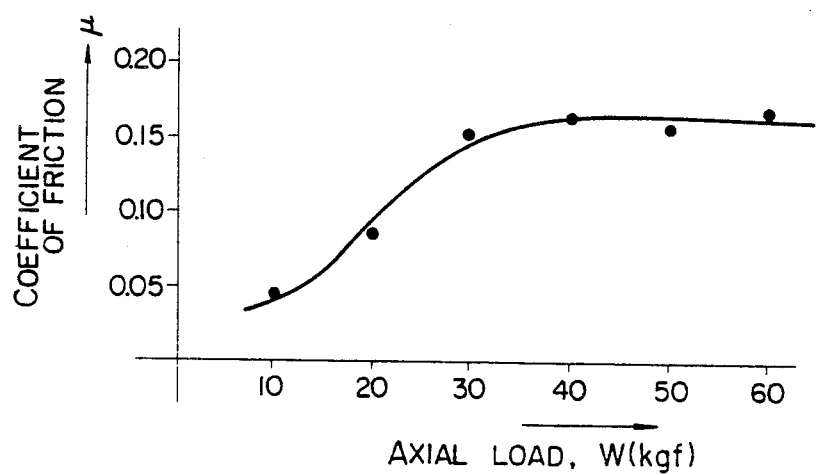
FIG. 2 is a graph showing the results of four ball machine test conducted on a spherical body of carbon material according to an embodiment of this invention.

The spherical bodies of carbon having vitreous fructured surfaces obtained in COMPARATIVE EXAMPLE 1 were further subjected to the load bearing test for surface flaw such as pitting, cracks, etc., by using the four-ball tester. The results are shown in FIG. 1. A similar test was also conducted on the spherical bodies of carbon material obtained in EXAMPLE 1, with the results thereof shown in FIG. 2. As seen from FIGS. 1 and 2, the conventional spherical bodies of carbon material are sharply increased and go on rising in coefficient of friction of the axial load applied thereto reaches around and exceeds 20 Kgf, whereas in the case of the spherical bodies according to this invention, the coefficient of friction thereof substantially hits the ceiling under the axial load of around 30 Kgf, and it remains stabilized at 0.15–0.16 even if the load is raised any further.

Figure 3:
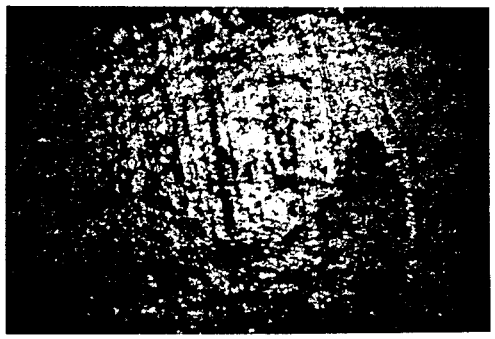
FIG. 3 is a photograph showing the surface condition of the conventional spherical body of carbon material after the four ball machine test.
Figure 4:
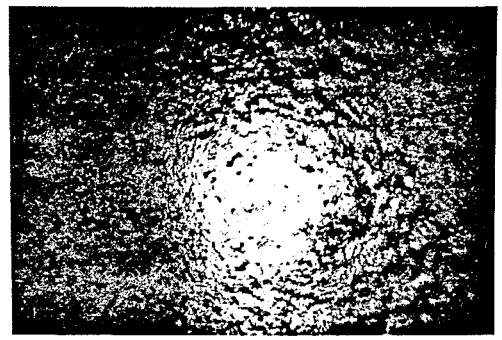
FIG. 4 is a photograph showing the surface condition of the spherical body of carbon material according to said embodiment of this invention after the four ball machine test.

The photographs showing the surface condition of the spherical bodies at the time of completion of the test by said four ball machine tester are given in FIG. 3 (conventional product) and FIG. 4 (product of this invention). As seen from these photographs, fretting damage was observed on the conventional product, but no abnormality was admitted in the external appearance of the spherical bodies according to the described embodiments of this invention.

As described above, the spherical bodies of carbon or graphite according to this invention, when used as sliding machine members, are markedly reduced in damage and flaw caused on the spherical surfaces thereof such as pitting, cracks, etc., and thus can serve advantageously as industrial machine parts.

What is claimed is:

1. A spherical body formed of a carbon material having a thermal conductivity at 25° C. of 0.03 cal/cm.sec.°C. to 1.0 cal/cm.sec.°C. and an anisotropy of thermal expansion coefficient of not more than 40% whereby the occurrence of pitting or cracking of the body due to thermal shock is prevented.

2. A spherical body formed of a carbon material according to claim 1, wherein the carbon material is baked carbon and is a carbon material which has been heat-treated in a non-oxidizing atmosphere.

3. A spherical body formed of a carbon material according to claim 1, wherein the carbon material is graphitized carbon and is a carbon material which has been heat-treated in a non-oxidizing atmosphere.

4. A spherical body formed of a carbon material according to claim 2, wherein the the baked carbon is obtained by heat treating a shaped green carbon at a temperature of 800° to 1300° C.

5. A spherical body formed of a carbon material according to claim 3, wherein the graphitized carbon is obtained by heat treating a shaped green carbon at a temperature of 2000° to 2600° C.

6. A spherical body formed of a carbon material according to claim 2, wherein the baked carbon has a thermal conductivity at 25° C. of at least 0.1 cal/cm.sec.°C. and an anisotropy of thermal expansion coefficient of not more than 25%.

7. A spherical body formed of a carbon material according to claim 3, wherein the graphitized carbon has a thermal conductivity at 25° C. of at least 0.5 cal/cm.sec.°C. and an anisotropy of thermal expansion coefficient of not more than 25%.

8. A spherical body formed of a carbon material according to claim 1, wherein said spherical body consists of a spherical particle consisting of the carbon material, said body exhibiting an anisotropy of thermal expansion coefficient of 0 to 40%.

9. A spherical body formed of a carbon material according to claim 1, wherein said carbon material is initially press-molded into a form close to a sphere shape and, thereafter, the molding is rolled to assume the final spherical form.

* * * * *

UNITED STATES PATENT AND TRADEMARK OFFICE
CERTIFICATE OF CORRECTION

PATENT NO.   : 4,489,132
DATED        : December 18, 1984
INVENTOR(S)  : T. Shimoyama It is certified that error appears in the above-identified patent and that said Letters Patent is hereby corrected as shown below:

Title page, left-hand column, the foreign application priority data Japanese application No. "56-14425" should read --56-144425--

*Signed and Sealed this*

*Sixteenth* Day of *July 1985*

[SEAL]

*Attest:*

DONALD J. QUIGG

*Attesting Officer*   *Acting Commissioner of Patents and Trademarks*